United States Patent
Wang

(10) Patent No.: US 8,566,521 B2
(45) Date of Patent: Oct. 22, 2013

(54) IMPLEMENTING CACHE OFFLOADING

(75) Inventor: Hao Wang, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 233 days.

(21) Appl. No.: 12/873,780

(22) Filed: Sep. 1, 2010

(65) Prior Publication Data

US 2012/0054446 A1  Mar. 1, 2012

(51) Int. Cl.
G06F 13/00 (2006.01)
G06F 13/28 (2006.01)
G06F 12/00 (2006.01)

(52) U.S. Cl.
USPC .............................. 711/119; 711/118; 711/135

(58) Field of Classification Search
USPC .......................................... 711/118, 119, 135
See application file for complete search history.

(56) References Cited

U.S. PATENT DOCUMENTS

| | | | |
|---|---|---|---|
| 6,078,994 A | | 6/2000 | Carey |
| 6,542,911 B2 * | | 4/2003 | Chakraborty et al. ................ 1/1 |
| 7,181,457 B2 * | | 2/2007 | Reinauer et al. ...................... 1/1 |
| 7,421,562 B2 * | | 9/2008 | Bhatt et al. ..................... 711/203 |
| 2005/0193160 A1 | | 9/2005 | Bhatt et al. |
| 2009/0198899 A1 * | | 8/2009 | Revanuru ..................... 711/128 |

* cited by examiner

*Primary Examiner* — Matthew Bradley
*Assistant Examiner* — Rocio Del Mar Perez-Velez
(74) *Attorney, Agent, or Firm* — Joan Pennington

(57) ABSTRACT

A computer-implemented method, computer program product, and system are provided for implementing a cache offloader. A current cache memory usage is compared with a memory threshold. Responsive to the current cache memory usage exceeding the memory threshold, cache records are selected to be offloaded. Available memory in a plurality of computer systems is identified and the selected cache records are sent to the identified available memory. Transactional systems are dynamically enabled to use memory cache across multiple connected computer systems on demand eliminating conventional evictor and data miss issues that adversely impact performance.

20 Claims, 8 Drawing Sheets

IMPLEMENTING CACHE OFFLOADING

FIELD OF THE INVENTION

The present invention relates generally to the data processing field, and more particularly, relates to a method, computer program product, and system for implementing least-recently-used (LRU) cache offloading.

DESCRIPTION OF THE RELATED ART

Cache is commonly used in multiple kinds of applications, servers and generally all transactional systems to increase performance. An evictor is often used to control cache size and memory. However, in some known arrangements once a cache record is evicted, the cache record is lost.

A need exists for efficient and effective method and mechanism for implementing control of memory cache. It is desirable to provide offloaded cache data on demand in a transactional system with minimized costs and maximized efficiency.

SUMMARY OF THE INVENTION

Principal aspects of the present invention are to provide a method, computer program product, and system for implementing least-recently-used (LRU) cache offloading. Other important aspects of the present invention are to provide such method, computer program product, and system substantially without negative effects and that overcome many of the disadvantages of prior art arrangements.

In brief, a computer-implemented method, computer program product, and system are provided for implementing cache offloading. A current cache memory usage is compared with a memory threshold. Responsive to the current cache memory usage exceeding the memory threshold, cache records are selected to be offloaded. Available memory in a plurality of computer systems is identified and the selected cache records are sent to the identified available memory.

In accordance with features of the invention, transactional systems are dynamically enabled to use memory cache across multiple connected computer systems on demand eliminating conventional evictor and data miss issues that adversely impact performance.

In accordance with features of the invention, cache records are selected to be offloaded using a least-recently-used (LRU) algorithm, or a usage algorithm tracking system that manages a time to live (TTL) or last access timestamp. Cache records are offloaded based upon grid topologies of multiple connected computer systems and a load of each computer system in the grid. Offloaded records are pulled back to the local cache when access pattern changes according to the LRU algorithm.

In accordance with features of the invention, an offloaded index builder builds offload candidates' index for the selected cache records to be offloaded, and an offload router sends the selected offload candidates to the selected offload target computer systems in the grid.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

In the following detailed description of embodiments of the invention, reference is made to the accompanying drawings, which illustrate example embodiments by which the invention may be practiced. It is to be understood that other embodiments may be utilized and structural changes may be made without departing from the scope of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In accordance with features of the invention, a computer-implemented method, computer program product, and system are provided for implementing a cache offloader. Transactional systems in accordance with the preferred embodiment are dynamically enabled to use memory cache across multiple connected computer systems on demand eliminating conventional evictor and data miss issues that adversely impact performance.

Figure 1:
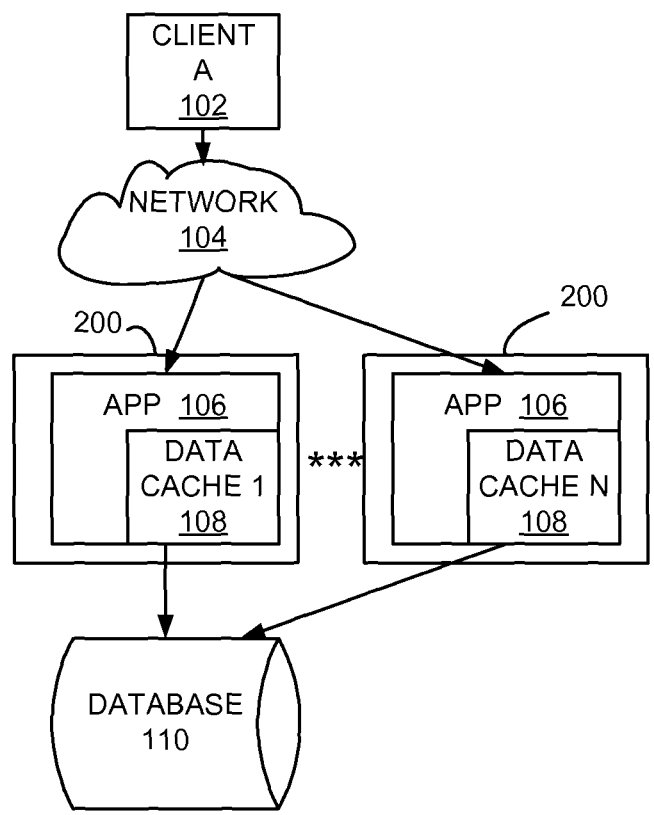
FIG. 1 is a block diagram representation illustrating an example system for implementing cache offloading in accordance with the preferred embodiment.

Having reference now to the drawings, in FIG. 1, there is shown an example system for implementing least-recently-used (LRU) cache offloading generally designated by the reference character 100 in accordance with the preferred embodiment. System 100 includes a client A, 102 connected by a network 104 to a plurality of computer systems 200, each including applications 106 and a respective data cache 1-N, 108. Each of the plurality of computer systems 200 is coupled to a database 110.

Figure 2:
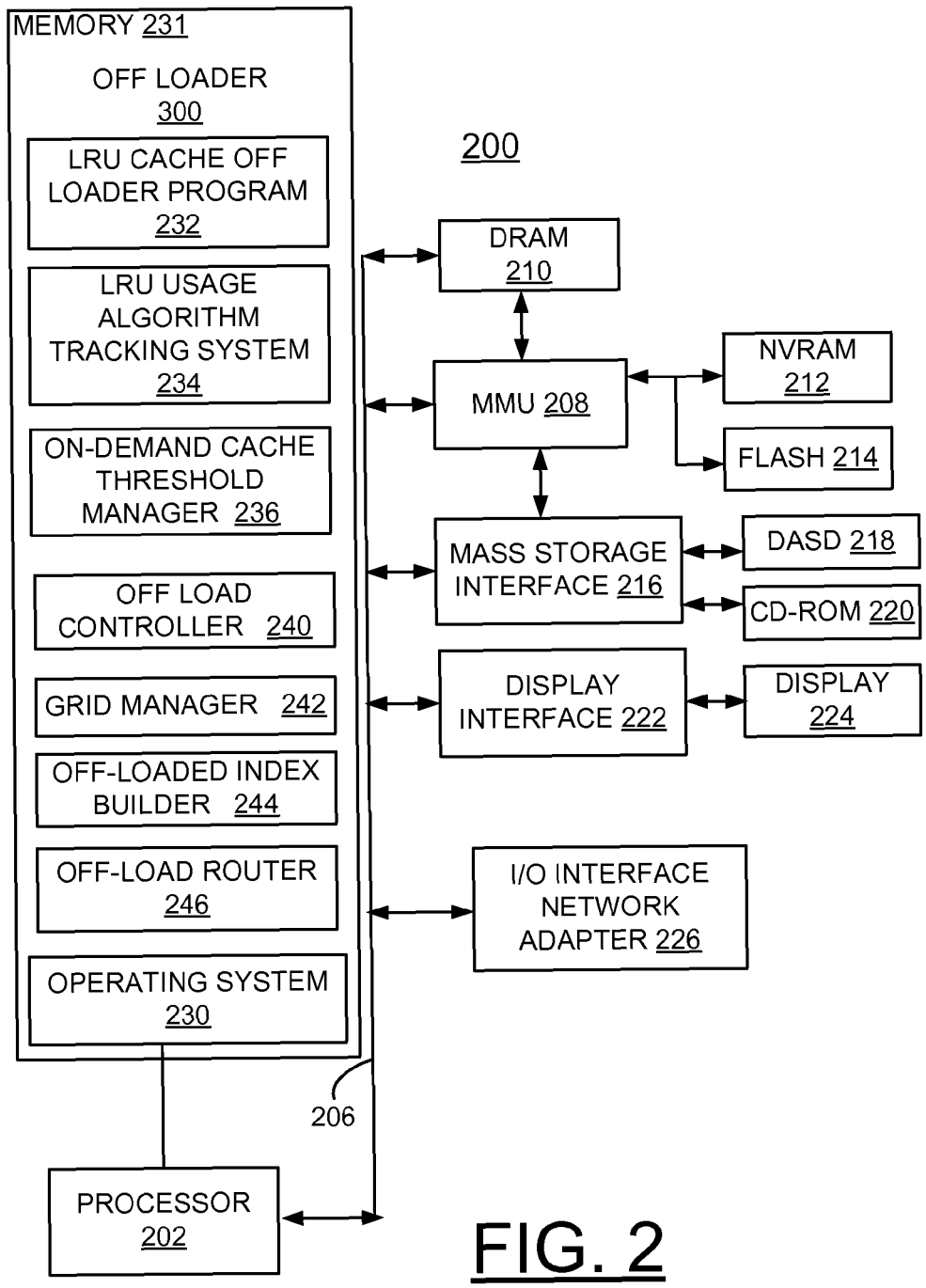
FIG. 2 is a block diagram representation illustrating an example computer system of FIG. 1 for implementing cache offloading in accordance with the preferred embodiment.

Referring also to FIG. 2, there is shown an example computer system 200 of system 100 for implementing cache off loading in accordance with the preferred embodiment. Computer system 200 includes a main processor 202 or central processor unit (CPU) 202 coupled by a system bus 206 to a memory management unit (MMU) 208 and system memory including a dynamic random access memory (DRAM) 210, a nonvolatile random access memory (NVRAM) 212, and a flash memory 214. A mass storage interface 216 coupled to the system bus 206 and MMU 208 connects a direct access storage device (DASD) 218 and a CD-ROM drive 220 to the main processor 202. Computer system 200 includes a display interface 222 connected to a display 224, and an input/output (I/O) interface network adapter 226 coupled to the system bus 206.

Computer system 200 includes an operating system 230, and an offloader 300 of the preferred embodiment resident in a memory 231. The major components of the offloader 300 of the preferred embodiment include a least-recently-used (LRU) cache offloader program 232 of the preferred embodiment, a LRU usage algorithm tracking system 234, or any usage algorithm tracking system that manages time to live (TTL) or last access timestamp, an on-demand threshold manager 236 that manages cache size according to memory and CPU usage each computer system or Java virtual machine (JVM), an offload controller 240 that selects or picks records as offload candidates to be sent to other partitioned JVMs according to the LRU usage algorithm tracking system 234, a grid manager 242 that decides where offload candidates should go according to grid topologies and each JVM load in the grid, an offloaded Index builder 244 that builds offload candidates' index, and an offload router 246 that sends offload candidates to the selected offload target JVMs in the grid.

System 100 and computer system 200 are shown in simplified form sufficient for understanding the present invention. The illustrated computer system 200 is not intended to imply architectural or functional limitations. The present invention can be used with various hardware implementations and systems and various other internal hardware devices, for example, multiple main processors.

Various commercially available computers can be used for system 100 and server computer 200, for example, an IBM server computer, such as an IBM eServer iSeries® system. CPU 202 is suitably programmed by the offloader 300 to execute the flowcharts of FIGS. 4, 5, 6 and 7 and for implementing cache offloading in accordance with the preferred embodiment.

Figure 3:
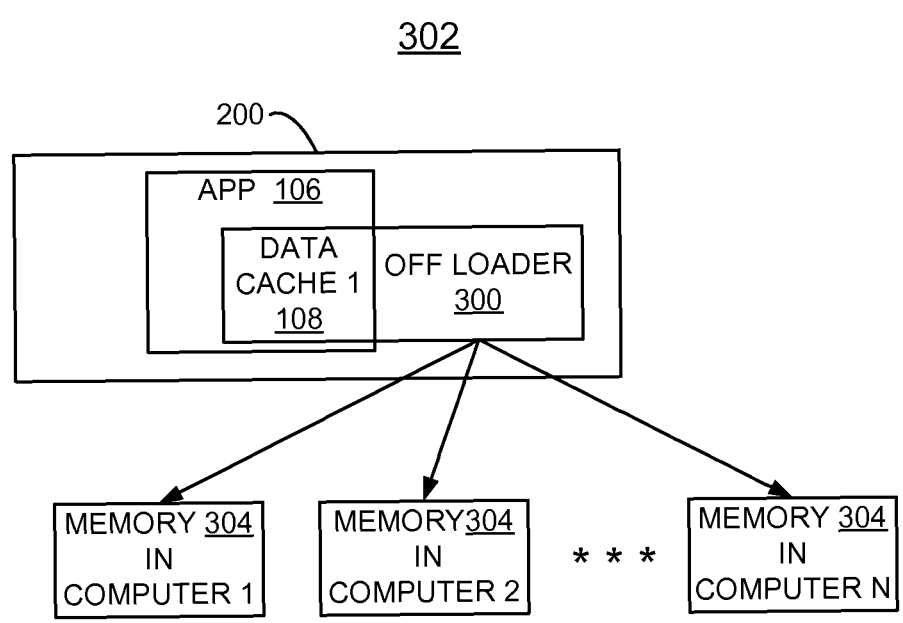
FIG. 3 is a block diagram representation illustrating example distributed memory system with components of the example systems of FIGS. 1 and 2 for implementing cache offloading in accordance with the preferred embodiment.

Referring to FIG. 3, there is shown example distributed memory system 302 with the offloader 300 of the example systems 100, 200 for implementing cache offloading in accordance with the preferred embodiment. Systems 300 and the offloader 300 are implemented to achieve highest efficiency with a shared adaptive memory 304 in a plurality of computers 1-N.

In accordance with features of the invention, offloader 300 enables offloading cache data records of from one JVM memory 304 to another JVM memory 304 while multiple partitioned cache 108 of the multiple computes 1-N still can participate in transactional processing at the same time. As an application 106 in distributed memory system 302 of the invention can host unlimited hypertext transfer protocol (HTTP) and session initiation protocol (SIP) transactional and conversational sessions in any application server's machine 200 because cache data records automatically offload on demand to multiple connected and partitioned JVM memory 304 while it is used seamlessly as single unlimited huge transactional in-memory single image system 302. Doing so, distributed cache 108 including the multiple connected and partitioned JVM memory 304 is not only used to replicate HTTP or SIP sessions for high availability, distributed cache is also used to offload session data that cannot be hold in single JVM cache 108 to enable scalability and high performance.

Figure 4:
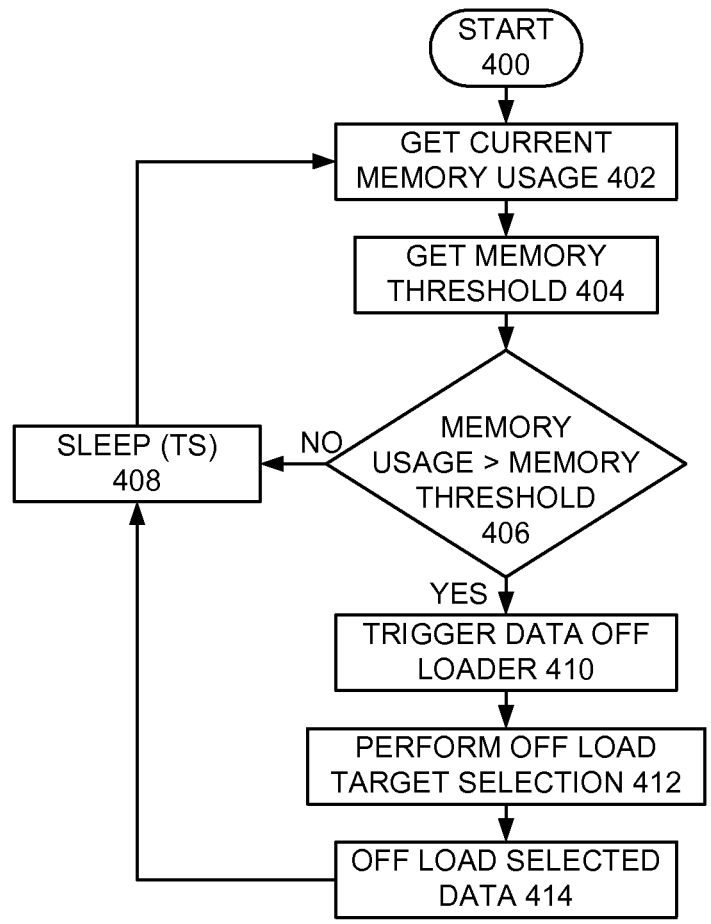
FIGS. 4, 5, 6, and 7 are flow charts illustrating exemplary sequential steps for implementing cache offloading in accordance with the preferred embodiment.

Referring now to FIG. 4, there are shown exemplary operations of the cache offloading controller for implementing cache offloading in accordance with the preferred embodiment starting at a block 400. A current memory usage is identified as indicated at a block 402. A memory threshold value is identified as indicated at a block 404. As indicated at a decision block 406, checking is performed to determine if the memory usage is greater than the memory threshold.

When the memory usage is not greater than the memory threshold, then a sleep period (TS) is provided as indicated at a block 408. When the memory usage is greater than the memory threshold, then further operation of the off loader 300 is triggered as indicated at a block 410. Next off load target selection is performed to identify off load record candidates to be sent to other partitioned JVM memory as indicated at a block 412. The selected data is off loaded as indicated at a block 414. Then the sleep period (TS) is provided at block 408, and the cache off loading operations continue.

Figure 5:
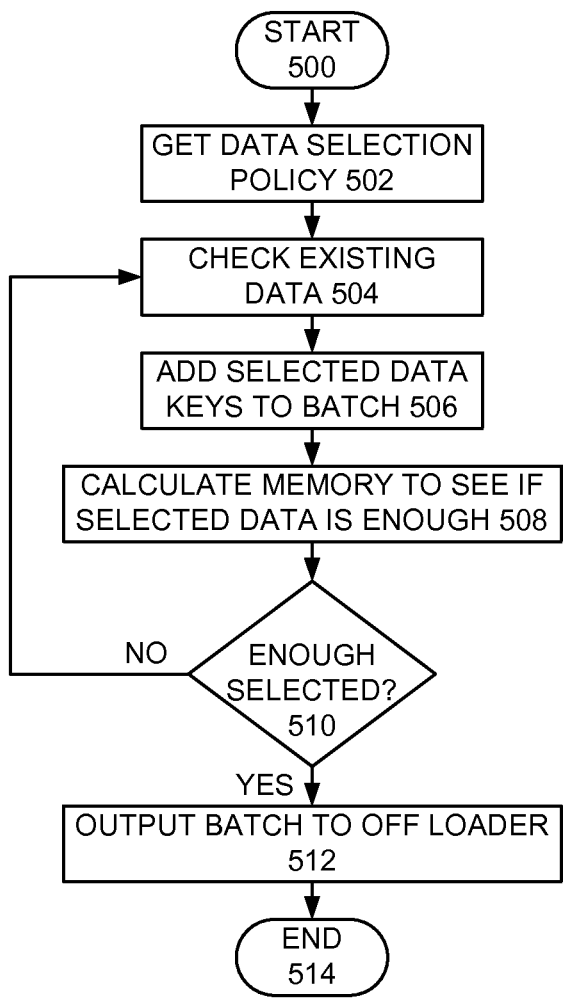

Referring now to FIG. 5, there are shown exemplary offload target selection operations of the cache offloading controller for implementing cache offloading in accordance with the preferred embodiment starting at a block 500. A target data selection policy is identified as indicated at a block 502. Then the stored existing data is checked as indicated at a block 504, for example, using the LRU usage algorithm tracking system 234, or any usage algorithm tracking system that manages time to live (TTL) or last access timestamp.

Selected data keys are added to a batch as indicated at a block 506. A memory calculation is performed to determine if the selected data includes enough off load record candidates to be sent to other partitioned JVM memory as indicated at a block 508. As indicated at a decision block 510, it is determined if the selected data is enough. If the selected data is not enough, then the off load target selection operations return to block 504 and are repeated. Otherwise if selected data is enough, then the batch is output to the off loader as indicated at a block 512. The operations end as indicated at a block 514.

Figure 6:
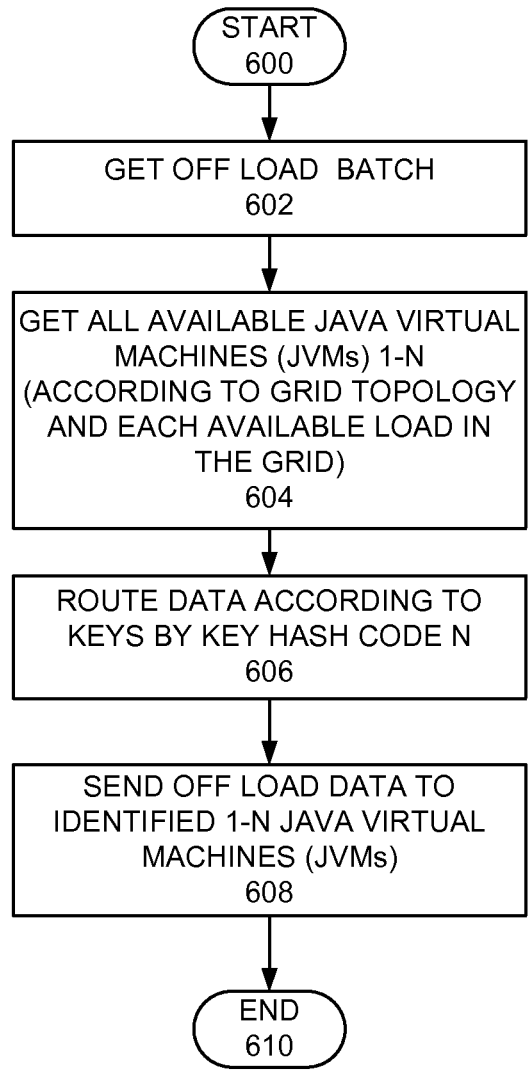

Referring now to FIG. 6, there are shown exemplary operations to route data to other JVMs of the cache offloading controller for implementing cache offloading in accordance with the preferred embodiment starting at a block 600. The offload batch is obtained as indicated at a block 602. As indicated at a block 604, all available Java Virtual Machines (JVMs) 1-N are obtained, for example, according to grid topology and each available load in the grid. Data is routed according to keys, for example, according to a key hash code N as indicated at a block 606. The offload data is sent to the JVMs 1-N as indicated at a block 608. The operations end as indicated at a block 610.

Figure 7:
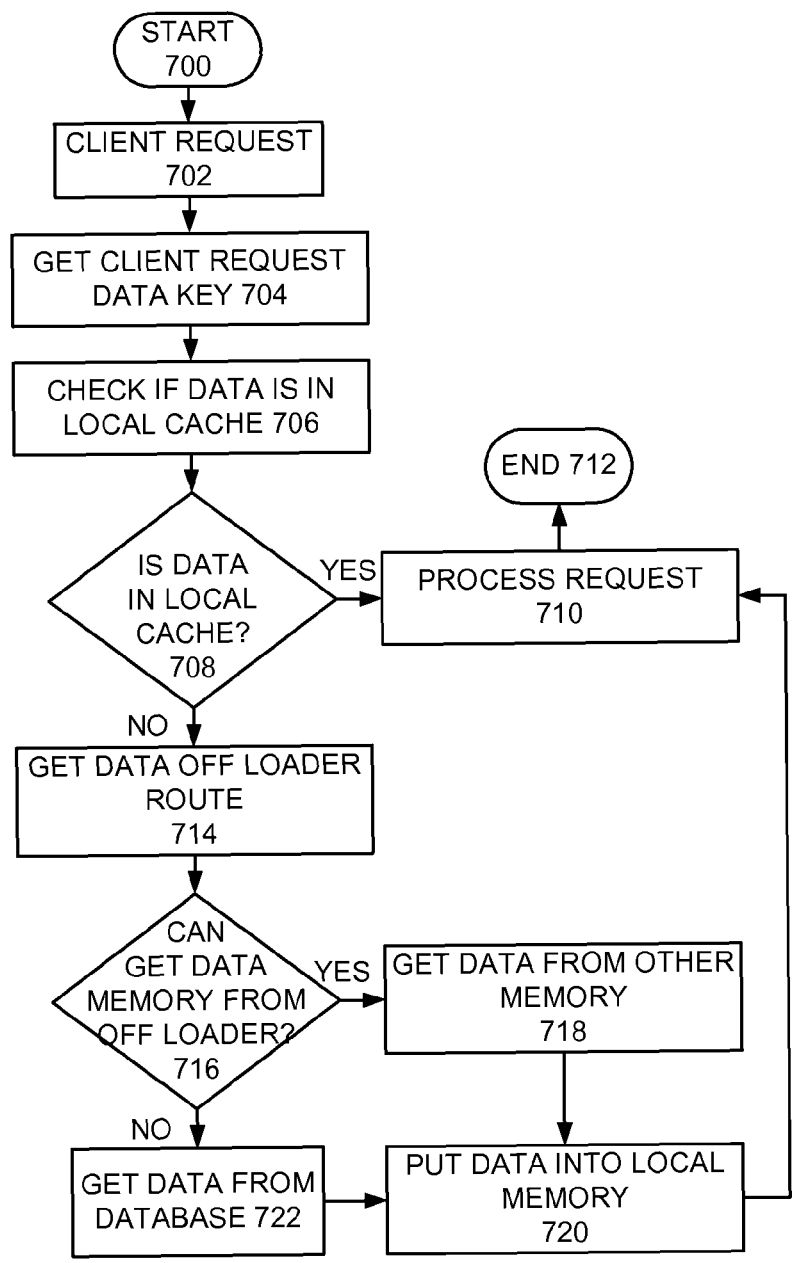

Referring now to FIG. 7, there are shown exemplary operations to access offloaded data from other JVMs of the cache offloading controller in accordance with the preferred embodiment starting at a block 700. A client request is received as indicated at a block 702. A client request data key is identified as indicated at a block 704. Checking if the requested data is in the local cache is performed as indicated at a block 706. If determined that the requested data is in the local cache as indicated at a decision block 708, the request is processed as indicated at a block 710. The operations end as indicated at a block 712.

If determined that the requested data is not in the local cache at decision block 708, then the data offloader route is obtained as indicated at a block 714. Checking whether the data memory can be obtained from the offloader is determined as indicated at a decision block 716. If yes, then the data is obtained from the other memory as indicated at a block 718. The retrieved data is put into the local memory as indicated at a block 720. Otherwise if the data memory can not be obtained from the offloader, the data is obtained from the database as indicated at a block 722. The request is processed at block 710, and then the operations end at block 712.

Figure 8:
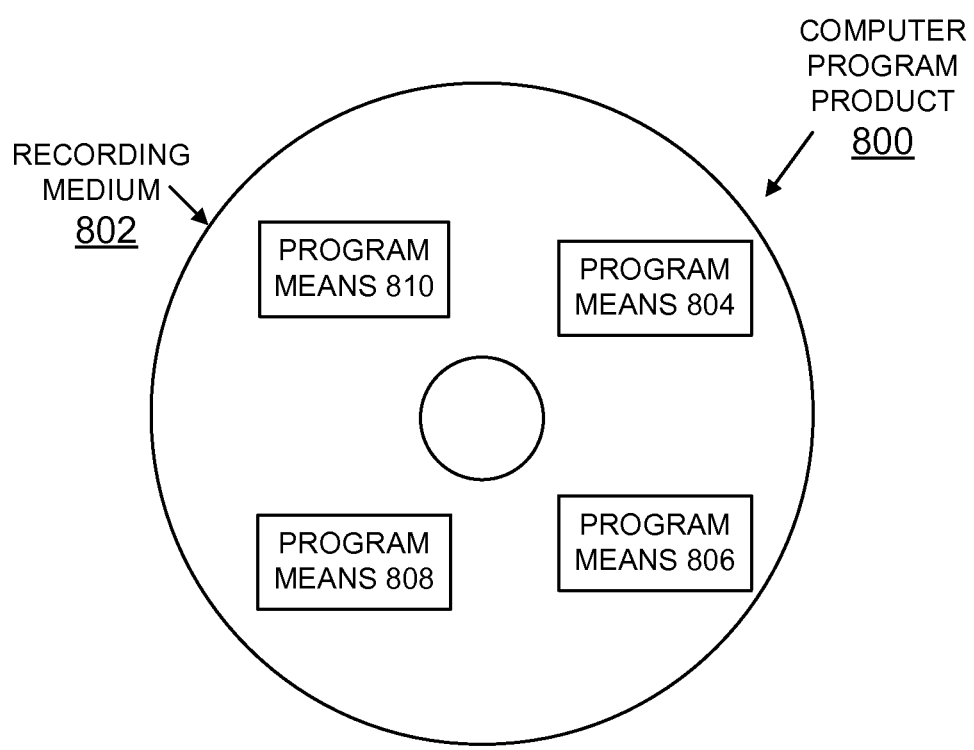
FIG. 8 is a block diagram illustrating a computer program product in accordance with the preferred embodiment.

Referring now to FIG. 8, an article of manufacture or a computer program product 800 of the invention is illustrated.

The computer program product 800 includes a recording medium 802, such as, a floppy disk, a high capacity read only memory in the form of an optically read compact disk or CD-ROM, a tape, or another similar computer program product. Recording medium 802 stores program means 804, 806, 808, 810 on the medium 802 for carrying out the methods for implementing cache offloading of the preferred embodiment in the system 100 of FIG. 1.

A sequence of program instructions or a logical assembly of one or more interrelated modules defined by the recorded program means 804, 806, 808, 810, direct the computer system 100 for implementing cache offloading of the preferred embodiment.

While the present invention has been described with reference to the details of the embodiments of the invention shown in the drawing, these details are not intended to limit the scope of the invention as claimed in the appended claims.

What is claimed is:

1. A computer-implemented method for implementing cache off loading in a system of a plurality of computer systems, each computer system coupled to a database and including a respective data cache, said computer-implemented method comprising:
    comparing a current cache memory usage with a memory threshold;
    responsive to the current cache memory usage not exceeding the memory threshold, providing a sleep period;
    responsive to the current cache memory usage exceeding the memory threshold, selecting cache records to be off loaded;
    responsive to selecting cache records to be off loaded, outputting an off load batch;
    responsive to selecting cache records to be off loaded, identifying available memory in the plurality of computer systems using a grid topology of the plurality of computer systems and each computer system load in the grid;
    routing data according to a key hash code;
    sending the selected cache records to be off loaded to the identified available memory; and
    responsive to sending the selected cache records, providing the sleep period and continuing with implementing cache off loading.

2. The computer-implemented method as recited in claim 1 includes receiving a client request, and responsive to data not being available in the local cache, checking for a data off loader route.

3. The computer-implemented method as recited in claim 2 includes responsive to identifying said data off loader route obtaining data from another memory.

4. The computer-implemented method as recited in claim 1 wherein selecting cache records to be off loaded includes maintaining a least recently used (LRU) tracking system and selecting LRU cache records to be off loaded.

5. The computer-implemented method as recited in claim 1 wherein the plurality of computer systems include a plurality of Java virtual machines (JVMs) and wherein responsive to the selected cache records to be off loaded, identifying available memory in the plurality of computer systems includes identifying available memory according to each JVM load of the plurality of computer systems.

6. The computer-implemented method as recited in claim 1 wherein sending the selected cache records to be off loaded to the identified available memory includes building an off load candidates index.

7. A system for implementing cache off loading in a computer system comprising:
    a plurality of computer systems, each computer system coupled to a database and including a respective data cache, and a processor;
    an off loader tangibly embodied in a non-transitory machine readable medium, said off loader including a least-recently-used (LRU) cache off loader program, a LRU usage tracking system tracking cache usage, an on-demand threshold manager managing cache memory usage; an off load controller selecting records as off-load candidates to be sent to an available other memory, a grid manager identifying available memory in a plurality of computer systems using a grid topology of the plurality of computer systems and each computer system load in the grid to send selected off-load candidates;
    said processor using said off loader, comparing a current cache memory usage with a memory threshold;
    said processor using said off loader, responsive to the current cache memory usage not exceeding the memory threshold, providing a sleep period;
    said processor using said off loader, responsive to the current cache memory usage exceeding the memory threshold, selecting cache records to be off loaded;
    said processor using said off loader, responsive to selecting cache records to be off loaded, identifying available memory in said plurality of computer systems;
    said processor using said off loader, responsive to selecting cache records to be off loaded, outputting an off load batch;
    said processor routing data according to a key hash code;
    said processor using said off loader, sending the selected cache records to be off loaded to the identified available memory; and
    said processor using said off loader, responsive to sending the selected cache records providing the sleep period and continuing with implementing cache off loading.

8. The system as recited in claim 7 includes said processor using said off loader, receiving a client request, and responsive to data not being available in the local cache, checking for a data off loader route.

9. The system as recited in claim 8 includes said processor responsive to identifying said data off loader route obtaining data from another memory.

10. The system as recited in claim 7 wherein said processor using said off loader, selecting cache records to be off loaded includes said processor maintaining a least recently used (LRU) tracking system and selecting LRU cache records to be off loaded.

11. The system as recited in claim 7 wherein the plurality of computer systems include a plurality of Java virtual machines (JVMs) and wherein said processor using said off loader, responsive to the selected cache records to be off loaded, identifying available memory in said plurality of computer systems includes said processor identifying available memory according to each JVM load of the plurality of computer systems.

12. The system as recited in claim 7 wherein said processor using said off loader, sending the selected cache records to be off loaded to the identified available memory includes said processor using said off loader, building an off load candidates index.

13. The system as recited in claim 7 wherein said off loader includes an off load index builder for building an off load index for selected cache records to be off loaded, and an off load router for sending the selected cache records to the identified available memory.

14. A computer program product for implementing cache off loading in a system of a plurality of computer systems, each computer system coupled to a database and including a respective data cache, said computer program product tangibly embodied in a non-transitory machine readable medium, said computer program product including instructions executed by the computer system to cause the computer system to perform the steps of:

comparing a current cache memory usage with a memory threshold;

comparing a current cache memory usage with a memory threshold;

responsive to the current cache memory usage not exceeding the memory threshold, providing a sleep period;

responsive to the current cache memory usage exceeding the memory threshold, selecting cache records to be off loaded;

responsive to selecting cache records to be off loaded, outputting an off load batch;

responsive to selecting cache records to be off loaded, identifying available memory in the plurality of computer systems using a grid topology of the plurality of computer systems and each computer system load in the grid;

routing data according to a key hash code;

sending the selected cache records to be off loaded to the identified available memory; and responsive to sending the selected cache records, providing the sleep period and continuing with implementing cache off loading.

15. The computer program product as recited in claim 14 includes receiving a client request, and responsive to data not being available in the local cache, checking for a data off loader route.

16. The computer program product as recited in claim 15 includes responsive to identifying said data off loader route obtaining data from another memory.

17. The computer program product as recited in claim 14 wherein selecting cache records to be off loaded includes maintaining a least recently used (LRU) tracking system and selecting LRU cache records to be off loaded.

18. The computer program product as recited in claim 14 includes providing an off load index builder for building an off load index for selected cache records to be off loaded.

19. The computer program product as recited in claim 14 includes providing an off load router for sending the selected cache records to the identified available memory.

20. The computer program product as recited in claim 14 wherein the plurality of computer systems include a plurality of Java virtual machines (JVMs) and wherein responsive to the selected cache records to be off loaded, identifying available memory in the plurality of computer systems includes identifying available memory according to each JVM load of the plurality of computer systems.

* * * * *